United States Patent
Felke et al.

(10) Patent No.: US 6,662,089 B2
(45) Date of Patent: Dec. 9, 2003

(54) METHOD AND APPARATUS FOR IMPROVING FAULT CLASSIFICATIONS

(75) Inventors: Timothy J. Felke, Glendale, AZ (US); David M. Kolbet, Glendale, AZ (US); Randy R. Magnuson, Scottsdale, AZ (US); Jeff J. van der Zweep, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 32 days.

(21) Appl. No.: 10/122,041

(22) Filed: Apr. 12, 2002

(65) Prior Publication Data

US 2003/0195675 A1 Oct. 16, 2003

(51) Int. Cl.$^7$ ............................. G06F 7/00; G08B 21/00
(52) U.S. Cl. ........................... 701/29; 701/14; 340/945; 340/963
(58) Field of Search .................... 701/29, 30, 14, 701/36; 340/945, 963

(56) References Cited

U.S. PATENT DOCUMENTS 5,937,366 A * 8/1999 Zbytniewski et al. ........ 702/108
6,253,147 B1   6/2001 Greenstein
6,448,781 B1 * 9/2002 Frank et al. ................. 324/533

FOREIGN PATENT DOCUMENTS

| EP | 1072991 A2 | 1/2001 |
| EP | 1079204 A1 | 2/2001 |
| GB | 2312518 A | 10/1997 |

* cited by examiner

Primary Examiner—Yonel Beaulieu

(57) ABSTRACT

A method for improving fault classifications for failure modes in complex systems, and a software program embodying the method or a corresponding method together with a computer based aircraft diagnostic system using such software is described. The method includes: capturing an observation that is consistent with a discrepancy of the complex system; identifying a set of failure modes of the complex system that are consistent with the observation; ranking, when the set includes more than one failure mode, the failure modes according to a degree of support the observation provides for each failure mode, the degree of support including a historical component; determining additional possible observations that are consistent with any failure mode included in the set; and ranking the possible observations according to how rapidly they reduce a number of failure modes included in the set; then preferably selecting a further observation and repeating the above steps until only one failure mode remains.

24 Claims, 2 Drawing Sheets

METHOD AND APPARATUS FOR IMPROVING FAULT CLASSIFICATIONS

FIELD OF THE INVENTION

This invention relates to maintenance and service of complex systems and more specifically methods and apparatus for improving fault classifications for such systems.

BACKGROUND OF THE INVENTION

Complex systems comprising tens or hundreds of inter-related and inter-operating systems and subsystems, many which may be complex in there own right, present unique maintenance and service challenges. Examples of such complex systems include factories, major buildings, ocean-going vessels, power generation plants, and aircraft to name a few. Complex systems and the inter-related and inter-operational nature of the systems and subsystems thereof often require equally complex and disciplined maintenance and service programs. These programs usually include documentation or records of observed or indicated irregularities or discrepancies and actions taken or services performed pursuant to resolution or prevention of such irregularities and discrepancies. This documentation is usually filled out, completed, or recorded by service and maintenance personnel. Expert systems and tools that can standardize service and maintenance diagnoses, procedures, cost estimates and so on are highly desirable for the time savings and precision they can offer to an overall maintenance and operational support program.

In the aircraft industry, for example, fault models that include, among other parameters and information, fault codes as a means to summarize the set of symptoms or standard observations that are expected to be present for each distinct fault condition in a particular type of aircraft have more recently come to be used. A fault code typically corresponds to a fault condition in a single system on the aircraft and is often used as the basis of diagnostic endeavors, including fault classification and fault isolation, material planning, cost estimation, and deferral/criticality analysis. Thus Fault Codes are a critical element of the Fault Model for an aircraft where a model is used to support an automated diagnostic and maintenance support system. Equally critical therefore is determining the proper fault code for the aircraft when presented with a discrepancy and set of symptoms or a given fault condition. Finding or determining or selecting the proper fault code based on readily apparent symptoms or observations is referred to as fault classification.

Presently airline personnel or technicians often determine the Fault Code for a fault condition by means of paper or electronic charts that provide a multiplicity of decision trees each consisting of observations states where each possible state of the observation is a branch of the tree. The leaves of the tree are the Fault Codes. This process is difficult to use since it is difficult to know which of the 100's of trees that are defined for an aircraft will best address the current situation. The static trees represented by the diagrams are also difficult to update and as such they do not reflect experience gained by the airline or airlines personnel.

Other systems for automated support of Fault Classification such as those available from Boeing, often referred to as PMA in the industry and Airbus, typically referred to as CATS, help to identify the diagram (tree) to use but do not provide a mechanism for incorporating experience into this decision or to effectively modify the decision tree itself based on this experience. Thus fault classification remains a very time consuming and error prone activity that adds complexity to the diagnostic and service procedures, increases costs, and reduces the precision of planning and cost analysis activities. Clearly a need exists for methods and apparatus for improving fault classification for complex systems, such as aircraft, preferably methods and apparatus that incorporate experience into such methods and apparatus.

SUMMARY OF THE INVENTION

The present invention in varying scope is a method and apparatus for improving fault classifications for failure modes in complex systems. One aspect of the invention is a software program comprising software instructions arranged to run on a processor to improve fault classification for failure modes in a complex system, the software program when installed and operating on a processor resulting in the processor performing an inventive method of fault classification. Another aspect according to the invention is a computer based aircraft maintenance and operations diagnostic system for improved assistance with fault classification for a fault condition within an aircraft based on a fault model for the aircraft, the computer utilizing an inventive embodiment of a fault classification software program to performs another inventive method of fault classification.

In one aspect the method includes the steps of: capturing an observation that is consistent with a discrepancy of the complex system; identifying a set of failure modes of the complex system that are consistent with the observation; ranking, when the set includes more than one failure mode, the failure modes according to a degree of support the observation provides for each failure mode, the degree of support including a historical component; determining additional possible observations that are consistent with any failure mode included in the set; and ranking the possible observations according to how rapidly they reduce a number of failure modes included in the set.

In narrower scope one aspect of the method will include a step of selecting a further observation from the possible observations and repeating, using the observation, the further observation and any additional possible observations that will be selected, the steps of identifying, ranking the failure modes, determining the additional possible observations, ranking these additional possible observations and selecting further possible observations until the set includes only one failure mode and then reporting that failure mode. The step of capturing the observation further preferably includes converting an observed discrepancy into one or more standard observations selected from a standard observations list and wherein the possible observations are possible standard observations that are members of the standard observation list. The process of identifying the set of the failure modes, preferably, includes identifying a standard failure mode selected from a standard failure mode list, the standard failure mode representing a set of observations consistent with the standard failure mode. Ranking the failure modes further uses an assessment of experience with the observation occurring with the failure mode to increase the degree or relative degree of support. Ranking the possible observations uses an algorithm to rank the possible observations according to the degree to which each possible observation divides the set of failure modes in half.

The software program is particularly suitable for use within a diagnostic tool for application to complex systems. In one aspect, using an embodiment of the software program, the invention is an aircraft maintenance and operations diagnostic system for improved assistance with fault classification for a fault condition within an aircraft based on a fault model for the aircraft, where the system comprises: a user interface; a computer, coupled to the user interface, having memory for storing software instructions and databases and a processor for; executing the software instructions to process information to facilitate the fault classification for the fault condition according to the fault model, the software instructions resulting in the computer: capturing a standard observation from an observation list that is part of the fault model and that is consistent with the fault condition; identifying a set of fault codes for the aircraft that are consistent with the standard observation; ranking, when the set includes more than one fault code, the fault codes according to a degree of support the standard observation provides for the fault code, the degree of support including a historical component; determining additional possible standard observations that are consistent with any fault code included in the set; and ranking the possible standard observations according to how rapidly they reduce a number of fault codes included in the set.

The above system in further inventive and narrower scope further includes a process of selecting a further standard observation from the possible standard observations and repeating, using the standard observation, the further standard observation and any additional possible standard observations that will be selected, said steps of identifying, ranking the fault codes, determining the additional possible standard observations, ranking the additional possible standard observations and selecting further possible standard observations until the set includes only one fault code and then reporting this fault code.

Preferably, the process of capturing the standard observation includes converting an observed discrepancy into one or more standard observations and the step of identifying the set of said fault codes includes identifying a fault code selected from a standard fault code list that is part of the fault model, the fault code representing a set of standard observations consistent with the fault condition. The process of ranking the fault codes, preferably further uses an assessment of a number of occurrences of a fault code and a number of co-occurrences of the standard observation and the fault code to increase the degree or relative degree of support. Ranking the possible observations, preferably, uses an algorithm to rank the possible observations according to the degree to which each possible observation divides the set of fault codes in half.

The system preferably further utilizes the monitor for displaying the set of possible observations as ranked to facilitate a user reviewing and selecting a further standard observation and further includes a portal to a wide area network to provide remote access to the system to provide diagnostic support for fault classification to remote users.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
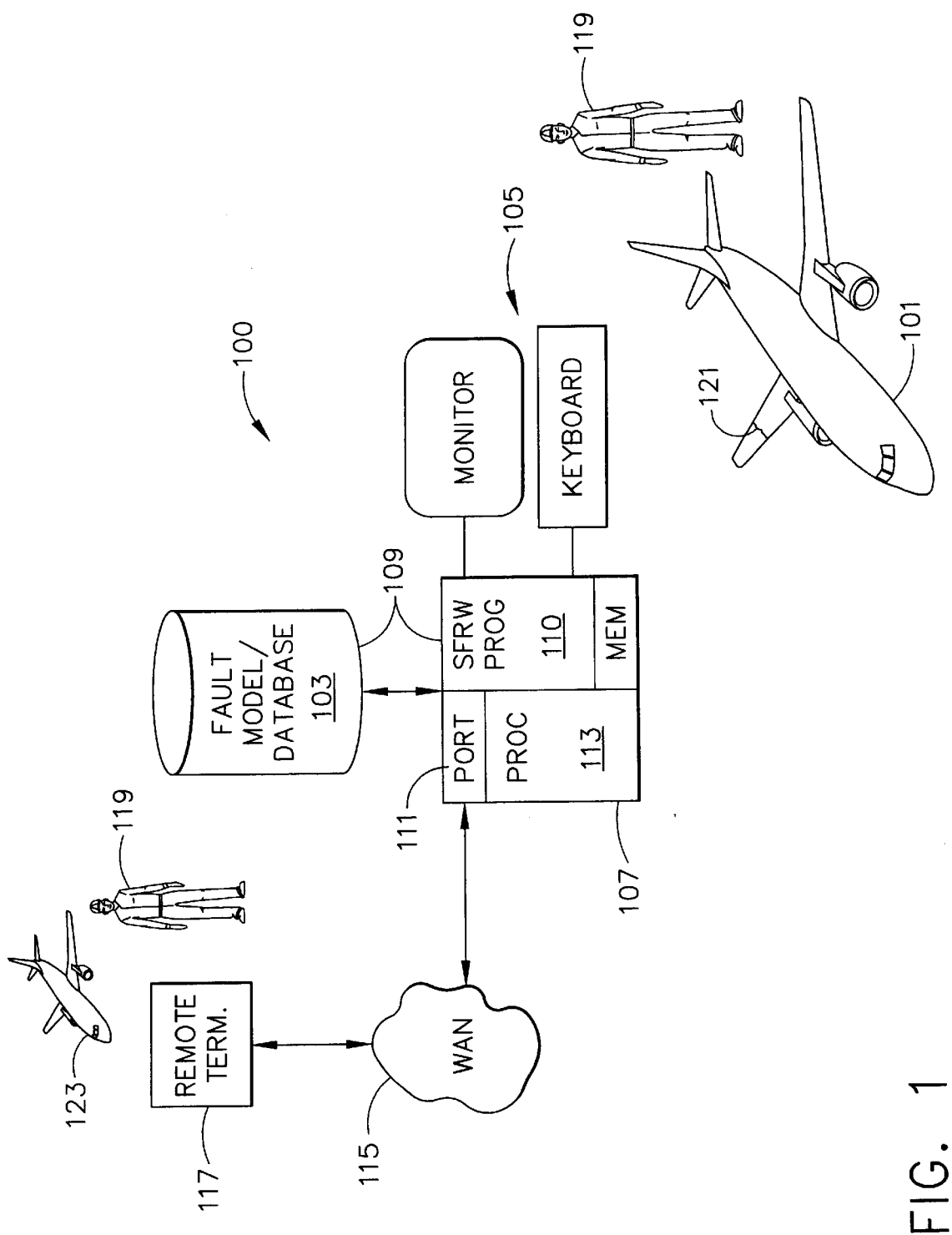
FIG. 1 depicts, in an exemplary form, a functional block diagram of a preferred computer based diagnostic system for facilitating fault classification in a complex system according to the present invention.

In overview form the present disclosure concerns and relates to systems for service, maintenance, and diagnostic support of complex systems and more specifically the disclosure relates to inventive methods and apparatus for assisting with fault classification for fault conditions or failure modes within such systems that incorporate historical diagnostic information. More particularly various inventive concepts and principles embodied in methods and apparatus for efficiently and systematically determining the proper fault classification for complex systems are discussed. The complex systems of particular interest are those associated with aircraft, however the concepts and principles discussed herein will be equally applicable to other complex systems such as those noted earlier.

As further discussed below various inventive principles and combinations thereof are advantageously employed to improve diagnostic efforts, specifically fault classification in a manner that incorporates and thus learns from historical diagnostic or classification information, such as previous diagnoses of similar fault conditions or failure modes. This data is, preferably, incorporated into fault models for the relevant systems, thus alleviating various problems, such as imprecise service and maintenance actions and descriptions, inflexibility or lack of adaptability, and the excess costs associated with known systems while still facilitating quality service, maintenance, and diagnostic activities and more precise labor, time, and cost estimates that will result from the more systematic classification of faults and thus forecasts of requisite isolation procedures and actions that are enabled by appropriate and consistent fault classification.

The instant disclosure is provided to further explain in an enabling fashion methodologies and techniques for making and using various embodiments in accordance with the present invention as well as the best modes of practicing the invention as contemplated by the inventor. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

FIG. 1 depicts, in an exemplary form, a functional block diagram of a preferred computer based diagnostic system, in a contextual and exemplary environment, for facilitating fault classification in a complex system according to the present invention. More particularly, an aircraft maintenance and operations diagnostic system 100 for improved assistance with fault classification for a fault condition within an aircraft 101 based on a fault model 103 for the aircraft is shown. The system is computer based and includes a user interface 105, such as a conventional keyboard and monitor and possibly means (not shown) for coupling to separate systems for downloading failure mode relevant data such as observed symptoms. Further included is a known computer 107 that is coupled to the user interface and has memory 109 for storing software instructions 110 and databases including the fault model and database 103, preferably a port 111 and a processor 113. The port is suitable for coupling to a Wide Area Network (WAN) 115 such as the PSTN or Internet to provide access to the system 100 from a remote terminal 117. Generally the system 100 is arranged and constructed so that a technician 119 or maintenance and diagnostic personnel can make observations of a discrepancy 121 and 10 interact with the system via the user interface to arrive at the proper fault classification thus repair and maintenance procedures and the like. Similarly a technician 119 at a remote terminal or remote user could interact with the system 100 and be provided diagnostic support there from in order to make appropriate fault classifications for remote aircraft 123.

In the interest of developing some common conventions we will briefly review fault models and fault classification conventions. A Fault Model 103 for an aircraft or other complex system, preferably, is a relational database that identifies the failure modes of the aircraft and the symptoms that each failure mode or fault condition produces. The symptoms are defined as either Observations or Test Results. Observations are the set of symptoms that are readily apparent to a technician 119 without running a test procedure or attaching supplemental equipment to the aircraft. Test Results are the set of symptoms that can only be discovered by running a test procedure or attaching supplemental equipment to the aircraft. Fault Classification only uses Observations to determine the Fault Code. As noted earlier fault codes are a means to summarize the set of symptoms or syndrome reported for each distinct fault condition or failure mode. Execution of Tests and interpreting their results is called Fault Isolation and it is not considered in this disclosure, however it is understood that proper fault classification will assist with fault isolation.

The Fault Classification approach preferably used by the system 100 uses the fault model 103 to provide aircraft by aircraft specific information that allows the Classification Software to be used for many different types of aircraft. In this scheme, each type of aircraft has a distinct Fault Model that identifies the Failure Modes, Observations, Test Procedures and Fault Codes that are defined for that aircraft type. The Fault Model may also contain various statistical information concerning the occurrence rates of each Failure Mode and the co-occurrence rates between the Fault Model entities in order to determine the information optimal activities to Support Fault Classification and Fault Isolation.

The processor 113 executes the software program 109 or instructions to process information to facilitate the fault classification for the fault condition or failure mode according to the fault model 103. Executing the software program results in the computer capturing a standard observation from an observation list that is part of the fault model and that is consistent with the fault condition. Preferably the technician 119 will observe the discrepancy 121 or fault condition and select from an offered list of observations one or more that match the technician's observations, thus converting an observed discrepancy into one or more standard observations. This is also referred to as reporting an initial observation which can be accomplished by one of several mechanisms. The most common mechanism is the one noted above however the system also allows Initial Observations to be reported by means of a data interface in order to allow observations that are down linked from the aircraft or generated by a secondary system to be reported. When an observation is reported, all existing fault conditions already reported for that piece of equipment are evaluated to determine if the new observation provides additional data regarding a current fault condition or if it represents a new fault condition. The technician then determines which of the currently open fault conditions they want to classify.

Then identifying a set of fault codes for the aircraft that are consistent with the standard observation is performed. Identifying the set of said fault codes is performed by the computer or processor automatically identifying one or more fault code selected from a standard fault code list that is included as part of the fault model, where the fault code represents a set of standard observations consistent with the fault condition.

Next, whenever the set of fault codes includes more than one, ranking, the fault codes according to a degree of support the standard observation provides for the fault code, where the degree of support includes or considers one or more historical components or factors. Ranking the fault codes further, preferably uses an assessment of a number of occurrences of a fault code and a number of co-occurrences of the standard observation and the fault code to increase the degree or relative degree of support. The ranking process is preferably accomplished using various additional concepts and constructs in conjunction with the fault model and the algorithm further explained below.

Of particular interest for the ranking procedures are the entities Observation (standard observation), FaultCode and the relationship FaultCodeHasObservations. For these purposes, Observation is the simplest record structure consisting of an ObservationKey and the description of the observation. A FaultCode record has a FaultCodeKey, a FaultCodeDescription and a counter that represent the number of times that this Fault Code has been reported by this operator and confirmed previously (PrevousCount). A FaultCodeHasObservations record has a keyvalue for the FaultCode, a key value for the Observation and a counter of the number of times that the Observation has occurred concurrently with the Fault Code (CoOccurrenceCount).

As noted above for any given fault condition, the algorithm finds the Fault Codes that are consistent with the standard observations reported. The set of Fault Codes that are considered are the ones that are linked to any of the Observations reported "Present" through the Fault Model relationship titled "Fault Code has Observations". It is important to note that the algorithm allows an Observation to be reported as "Present", "Absent" or "Unknown". Observations that are reported "Present" are evaluated using the CoOccurrence counts in the Fault Model to determine how much that Observation indicts, indicates or supports each Fault Code. Observations that are reported as "Absent" are evaluated using the PreviousCount of the Fault Code and the CoOccurrance Count in order to determine how much that Observation acquits, detracts from or counter indicates or is inconsistent with each Fault Code. Observations reported "Unknown" and all Observations not reported are ignored in the calculation.

Each candidate Fault Code or member of the set of fault codes is ranked according to the following algorithm.

For each Fault Code; $FaultCode_x$
   Initialize its $FautCodeSupport_x = PreviousCount_x$
   For each $Observation_y$ reported "Present"
      $FaultCodeSupport_x = Min(FaultCodeSupport_x, CoOccurrence_{xy})$
   For each Observation reported "Absent"
      $FaultCodeSupport_x = Min(FaultCodeSupport_x, PreviousCount_x - CoOccurrence_{xy})$ The system then presents each Fault Code with FaultCodeSupport>0 to the user in descending order.

This algorithm is an outer loop indexed to x or the fault codes that are members of the set of fault codes and two inner sequential loops. The degree of support for a particular fault code, FaultCodeSupport, is initialized with the PreviousCount for that fault code, defined above, this being one historical component that incorporates some learning in the ranking process. The first inner loop is indexed to y for the Observations that have been reported as present and the second loop to y for any Observation consistent with a fault code that have been reported as absent. In the end the algorithm produces a number between 0 and the previous count. A "0" indicates that one of the observations as reported is completely contradictory to the fault code while a result equal to the PreviousCount for a fault code indicates that all reported observations are completely indicative or consistent with the fault code. Note that learning occurs because when the diagnostic stage is complete and a fault code has been determined (fault has been classified) and after a repair is undertaken and the fault classification confirmed the PreviousCount for the fault code as well as the CoOccurrence counts for reported present Observations will be incremented. The CoOccurrence counts of those observations that have not been reported present or absent but that are consistent with the confirmed fault code will be modified to retain their ratio with the PreviousCount of the fault code prior to it having been incremented.

In any event next the computer or processor will determine additional possible standard observations that are consistent with any fault code in the set; and rank these possible standard observations according to how rapidly they reduce a number of fault codes included or remaining within the set. This will assist the technician in quickly making a proper fault classification or diagnoses. Ranking the possible observations, preferably, uses an algorithm to rank the possible observations according to the degree to which each possible observation divides said set of fault codes in half. Once ranked these possible observations will preferably be displayed on the monitor so as to assist the user or technician in reviewing and selecting a further standard observation.

When more than one Fault Code remains possible, the algorithm below computes the effectiveness of each possible additional Observation and advises the technician according to the computations described herein after. These additional possible observations are ranked by how quickly they reduce the set of possible Fault Codes down to a single choice. As in the game "Twenty Questions", the best "Yes/No" questions are the ones that tend to divide the ambiguity group or set of fault codes in half. This is known as a Binary Search and the Observation Ranking algorithm rates each possible observation (which acts like a Yes/No question) in terms of the degree it splits the ambiguity group in half.

The following algorithm performs the ranking of possible Observations:

For all $FaultCode_x$ in the ambiguity group or set of fault codes compute, $FaultCodeSupportSum = sum(FaultCodeSupport_x)$
   $CurrentAmbiguity = FaultCodeSupport/max(FaultCodeSupport_x)$
   For all $Observation_y$, $TopUnlinkedFaultCode_y = 1$
   For each $FaultCode_x$ in the current ambiguity group,
   For each $Observation_y$ linked to $FaultCode_x$ compute,
      $NormalCoOccurenceCount_{xy} = CoOccurrence_{xy} * FaultCodeSupport_x / PreviousCount_x$
      $ObsPresAmbCount_y = sum(NormalCoOccurenceCount_{xy})$
      $ObsPresAmbMax_y = max(NormalCoOccurenceCount_{xy}, ObsPresAmbMax_y)$
      $ObsAbsAmbMax_y = max((FaultCodeSupport_x - NormalCoOccurenceCount_{xy}), ObsAbsAmbMax_y)$
   If $TopUnlinkedFaultCode_y = x$ Then $TopUnlinkedFaultCode_y = x+1$
   $ObsOfInterest_y = true$
   For each $Observation_y$ that is of interest for the current ambiguity group of fault codes compute,
      $ObsAbsAmbCount_y = FaultCodeSupportSum - ObsPresAmbCount_y$
      $ObsAbsAmbMax_y = max(ObsAbsAmbMax_y, FaultCodeSupport_{TopUnlinkedFaultCode_y})$
      $ObsPresLikelihood_y = ObsPresAmbCount_y / FaultCodeSupportSum$
      $ObsAbsLikelihood_y = ObsAbsAmbCount_y / FaultCodeSupportSum$
      $ObsPresEquivAmbiguity_y = ObsPresAmbCount_y / ObsPresAmbMax_y$
      $ObsAbsEquivAmbiguity_y = ObsAbsAmbCount_y / ObsAbsAmbMax_y$
      $ObsEquivAmbiguity_y = (ObsPresLikelihood_y * ObsPresEquivAmbiguity_y) + (ObsAbsLikelihood_y * ObsAbsEquivAmbiguity_y) + (ObsAbsLikelihood_y * ObsAbsEquivAmbiguity_y)$ Sort $Observation_y$ in ascending $ObsEquivAmbiguity_y$ order where $Observation_y$ is of interest for the current ambiguity group of fault codes and where $ObsEquivAmbiguity_y < CurrentAmbiguity$. The Observation with the smallest value of ObsEquivAmbiguity is the one that most closely approximates a binary search.

The algorithm incorporates an outer loop indexed to x or the fault codes that are members of the ambiguity set and an inner loop indexed to y or the set of observations explicitly linked to the fault code at index x followed by another loop indexed to y or the set of observations.

An approximate. CurrentAmbiguity for fault codes in the ambiguity set is determined to establish the upper limit for the equivalent ambiguity of observations consistent with one or more fault codes in the ambiguity set that will reduce the size of the ambiguity set if reported present or absent.

The CoOccurrence count between fault code x and each observation y is normalized (scaled-down) from the previous count of fault code x to the level of FaultCodeSupport for fault code x as calculated from the reported present and absent observations. Furthermore, each Observation initially assumes the highest-ranking fault code to which it is not consistent is the first one in the ambiguity set. The actual highest-ranking fault code that is not directly associated with each observation is determined over the course of the algorithm to finally compute the maximum ambiguity encountered by asserting each said observation absent. The normalized 'present' sum and maximum and 'absent' sum ambiguity terms for each observation used to calculate an equivalent ambiguity for each said observation are directly computable in the algorithms first loop.

The second loop in the algorithm finalizes and assembles the individual present and absent terms used to compute the likelihood that an observation y is present or absent and the resulting combined equivalent ambiguity derived from the possibility of asserting the observation y present or absent is used to establish the rank of that observation y.

In the end, the algorithm ignores observations in the original list that are not directly linked to a fault code in the ambiguity set or have an equivalent ambiguity that is greater than the approximate ambiguity computed for that fault code set from the observations known to be present or absent. The remaining observations are sorted in order of increasing value of ObsEquivAmbiguity which has the effect of presenting the observations most likely to reduce the fault code set by half to the user first while eliminating those observations that will not assist in making a proper fault classification or diagnoses. Thus the user is aided in looking for an observation that will most quickly complete the task of fault classification.

Then the user can select a further standard observation a present or absent from the possible standard observations and the system operates to repeat, using the standard observation, the further standard observation and any additional possible standard observations that will be selected, the identifying, the ranking the fault codes, the determining the additional possible standard observations, the ranking the additional possible standard observations and the selecting further possible standard observations until the set of fault codes includes only one fault code and then the user or technician can report this fault code thus completing the fault classification task.

Figure 2:
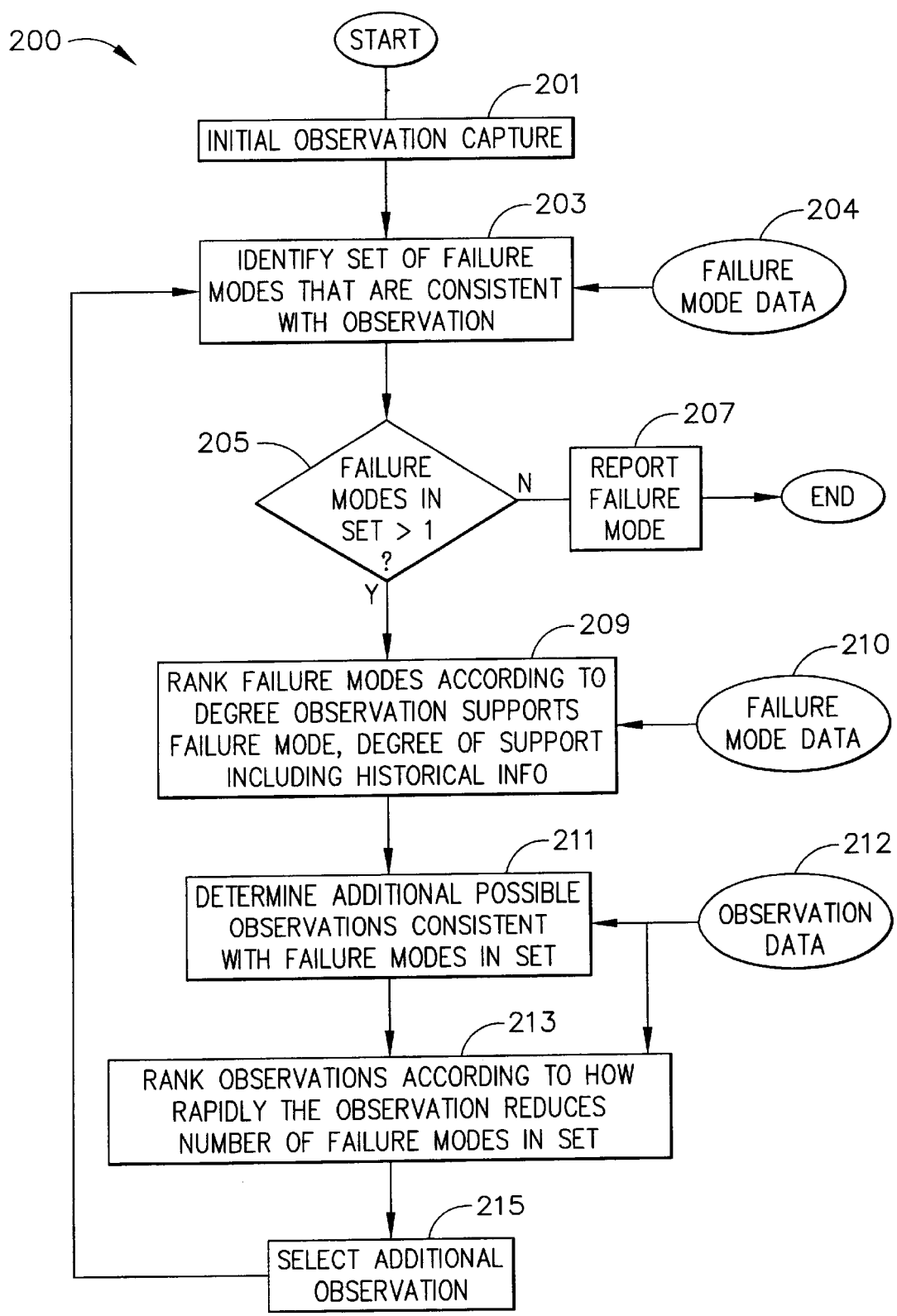
FIG. 2 depicts a flow chart of a preferred method embodiment according to the present invention.

Referring to the FIG. 2 a flow chart of a preferred method 200 embodiment of improving fault classification for failure modes in complex systems is depicted. The method 200 is similar to the process as above implemented and would utilize similar algorithms though this method is more general in nature and begins at 201 by capturing an observation that is consistent with a discrepancy of the complex system. This capturing process preferably includes converting an observed discrepancy into one or more standard observations selected from a standard observations list and as we will later introduce wherein any further possible observations are also possible standard observations that are members of the standard observations list.

At 203 the method identifies a set of failure modes of the complex system that are consistent with the observation. This step of identifying the set of failure modes includes, preferably includes identifying a standard failure mode selected from a standard failure modes list, the standard failure mode representing a set of observations consistent with the standard failure mode. This is accomplished with reference to the failure mode data 204 typically available from fault models or the like. At 205 we test whether more than one failure mode is in the set of failure modes and if not this failure mode is reported at 207 and the process ends.

Otherwise the method undertakes ranking the failure modes at 209 according to a degree of support the observation provides for each failure mode, the degree of support including a historical component. This is facilitated by the reference to failure mode data 210 that will be part of a fault or failure model or the like. The process of ranking the failure modes further uses an assessment of experience with the observation occurring with the failure mode to increase the degree or elative degree of support thus learning as experience is gained. An algorithm such as discussed above would be the preferred approach for this ranking procedure.

Then at 211 determining additional possible observations that are consistent with any failure mode included in the set is performed with the aid or reference to observation data 212 again available from a model of faults or failures for typical complex systems. At 213 these additional possible observations are ranked with the reference to observation data 212 according to how rapidly they reduce a number of failure modes included in the set. Again an algorithm such as discussed above would be suitable for this task. As we noted, preferably, the algorithm for ranking the possible observations ranks them according to the degree to which each possible observation divides the set of failure modes in half, thereby facilitating a binary or near binary search. As we also noted the observations preferably can be reported as present or absent or unknown and the algorithms will incorporate that information into their ranking tasks as well as the learning that occurs as co-occurrences between a failure mode and an observation that is consistent therewith occur.

An additional preferred step 215 for the method is selecting a further observation from the possible observations and then returning to step 203 and repeating steps 203–215, using the observation, the further observation and any additional possible observations that will be selected, the steps of identifying, ranking the failure modes, determining the additional possible observations, ranking the additional possible observations and selecting further possible observations until the set includes only one failure mode as determined at 205 and then reporting the failure mode at 207. This method is suitable for use as a diagnostic tool when applied to a plurality of fault models for a plurality of aircraft.

A suitable way to perform the method is through a software program comprising software instructions that are arranged to run on a processor to improve fault classification for failure modes in a complex system, the software program when installed and operating on a processor results in the processor performing a method according to FIG. 2.

The processes, discussed above, and the inventive principles thereof are intended to and will alleviate problems, such as inconsistent and time wasting diagnostics and corrective actions or records thereof caused by prior art diagnostic, maintenance and service procedures for fault classification. Using these principles of fault classification or fault code selection or failure mode selection will simplify service and maintenance estimations, projections, and procedures and save costs associated with inconsistent activities.

Various embodiments of methods, systems, and apparatus for developing fault classification with or without a corresponding fault model so as to facilitate and provide for consistent and cost effective maintenance and service programs for complex systems have been discussed and described. It is expected that these embodiments or others in accordance with the present invention will have application to many complex systems.

The disclosed principles and concepts extend to these systems and specifically to methods employed for maintenance and service thereby and therein. This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A method for improving fault classifications for failure modes in complex systems, the method including the steps of:

capturing an observation that is consistent with a discrepancy of the complex system;

identifying a set of failure modes of the complex system that are consistent with said observation;

ranking, when said set includes more than one failure mode, said failure modes according to a degree of support said observation provides for each failure mode, said degree of support including a historical component;

determining additional possible observations that are consistent with any failure mode included in said set; and ranking said possible observations according to how rapidly they reduce a number of failure modes included in said set.

2. The method of claim 1 further including a step of selecting a further observation from said possible observations and repeating, using said observation, said further observation and any additional possible observations that will be selected, said steps of identifying, ranking said failure modes, determining said additional possible observations, ranking said additional possible observations and selecting further possible observations until said set includes only one failure mode and then reporting said one failure mode.

3. The method of claim 1 wherein said step of capturing said observation includes converting an observed discrepancy into one or more standard observations selected from a standard observations list and wherein said possible observations are possible standard observations that are members of said standard observations list.

4. The method of claim 1 wherein said step of identifying said set of said failure modes includes identifying a standard failure mode selected from a standard failure modes list, said standard failure mode representing a set of observations consistent with said standard failure mode.

5. The method of claim 1 wherein said step of ranking said failure modes further uses an assessment of experience with said observation occurring with said failure mode to increase said degree of support.

6. The method of claim 1 wherein said ranking said possible observations uses an algorithm to rank said possible observations according to the degree to which each possible observation divides the set of failure modes in half.

7. The method of claim 1 wherein said possible observations can be reported as one of present, absent, and unknown.

8. The method of claim 1 used within a diagnostic tool and applied to a plurality of fault models for a plurality of aircraft.

9. A software program comprising software instructions arranged to run on a processor to improve fault classification for failure modes in a complex system, the software program when installed and operating on a processor resulting in the processor:

capturing an observation that is consistent with a discrepancy of the complex system;

identifying a set of failure modes of the complex system that are consistent with said observation;

ranking, when said set includes more than one failure mode, said failure modes according to a degree of support said observation provides for each failure mode, said degree of support including a historical component;

determining additional possible observations that are consistent with any failure mode included in said set; and ranking said possible observations according to how rapidly they reduce a number of failure modes included in said set.

10. The software program of claim 9 further including selecting a further observation from said possible observations and repeating, using said observation, said further observation and any additional possible observations that will be selected, said identifying, said ranking said failure modes, said determining said additional possible observations, said ranking said additional possible observations and said selecting further possible observations until said set includes only one failure mode and then reporting said failure mode.

11. The software program of claim 9 wherein said capturing said observation includes converting an observed discrepancy into one or more standard observations selected from a standard observations list and wherein said possible observations are possible standard observations that are members of said standard observations list.

12. The software program of claim 9 wherein said identifying said set of said failure modes includes identifying a standard failure mode selected from a standard failure modes list, said standard failure mode representing a set of observations consistent with said standard failure mode.

13. The software program of claim 9 wherein said ranking said failure modes further uses an assessment of experience with said observation occurring with said failure mode to increase said degree of support.

14. The software program of claim 9 wherein said ranking said possible observations uses an algorithm to rank said possible observations according to the degree to which each possible observation divides the set of failure modes in half.

15. The software program of claim 9 wherein said possible observations can be reported as one of present, absent, and unknown.

16. The software program of claim 9 used within a diagnostic tool and applied to a plurality of fault models for a plurality of aircraft.

17. An aircraft maintenance and operations diagnostic system for improved assistance with fault classification for a fault condition within an aircraft based on a fault model for the aircraft, the system comprising in combination:

a user interface;

a computer, coupled to the user interface, having memory for storing software instructions and databases and a processor for;

executing said software instructions to process information to facilitate the fault classification for the fault condition according to a fault model, the software program resulting in the computer:

capturing a standard observation from an observation list that is part of the fault model and that is consistent with the fault condition;

identifying a set of fault codes for the aircraft that are consistent with said standard observation;

ranking, when said set includes more than one fault code, said fault codes according to a degree of support said standard observation provides for each fault code, said degree of support including a historical component;

determining additional possible standard observations that are consistent with any fault code included in said set; and ranking said possible standard observations according to how rapidly they reduce a number of fault codes included in said set.

18. The system of claim 17 further including selecting a further standard observation from said possible standard observations and repeating, using said standard observation, said further standard observation and any additional possible standard observations that will be selected, said identifying, said ranking said fault codes, said determining said additional possible standard observations, said ranking said additional possible standard observations and selecting further possible standard observations until said set includes only one fault code and then reporting said fault code.

19. The system of claim 17 wherein said capturing said standard observation includes converting an observed discrepancy into one or more standard observations.

20. The system of claim 17 wherein said identifying said set of said fault codes includes identifying a fault code selected from a standard fault code list that is part of the fault model, said fault code representing a set of standard observations consistent with the fault condition.

21. The system of claim 17 wherein said ranking said fault codes further uses an assessment of a number of occurrences of a fault code and a number of co-occurrences of said standard observation and said fault code to increase said degree of support.

22. The system of claim 17 wherein said ranking said possible observations uses an algorithm to rank said possible observations according to the degree to which each possible observation divides said set of fault codes in half.

23. The system of claim 17 further including displaying said set of possible observations as ranked on said user interface to facilitate a user reviewing and selecting a further standard observation.

24. The system of claim 17 further including a portal to a wide area network to provide remote access to said system to provide diagnostic support for fault classification to remote users.

* * * * *